United States Patent
Yoo et al.

(10) Patent No.: US 9,600,417 B2
(45) Date of Patent: Mar. 21, 2017

(54) DATA CACHING

(71) Applicant: Google Inc., Mountain View, CA (US)

(72) Inventors: Richard Yoo, San Jose, CA (US); Liqun Cheng, San Jose, CA (US); Benjamin C. Serebrin, Sunnyvale, CA (US); Parthasarathy Ranganathan, San Jose, CA (US); Rama Krishna Govindaraju, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/699,014

(22) Filed: Apr. 29, 2015

(65) Prior Publication Data

US 2016/0321176 A1    Nov. 3, 2016

(51) Int. Cl.
 G06F 12/00    (2006.01)
 G06F 12/0811    (2016.01)

(52) U.S. Cl.
 CPC .... G06F 12/0811 (2013.01); *G06F 2212/283* (2013.01)

(58) Field of Classification Search
 CPC .............. G06F 12/0811; G06F 2212/283
 See application file for complete search history.

(56) References Cited

U.S. PATENT DOCUMENTS

| | | | |
|---|---|---|---|
| 6,021,470 A | 2/2000 | Frank | |
| 7,596,662 B2 | 9/2009 | Makineni | |
| 7,984,241 B2 | 7/2011 | Kurichiyath | |
| 8,606,997 B2 * | 12/2013 | Cypher | G06F 12/0811 711/117 |
| 8,949,544 B2 | 2/2015 | Loh | |
| 2009/0327584 A1 | 12/2009 | Tetrick et al. | |
| 2010/0042773 A1 | 2/2010 | Yeh | |

(Continued)

FOREIGN PATENT DOCUMENTS

WO    2015/014302    2/2015

OTHER PUBLICATIONS

"CPU cache", from Wikipedia, the free encyclopedia, downloaded online on Feb. 27, 2015, at http://en.wikipedia.org/w/index.php?title=CPU_cache&oldid=649005082, 25 pages.

(Continued)

*Primary Examiner* — David X Yi
*Assistant Examiner* — Alan Otto
(74) *Attorney, Agent, or Firm* — Fish & Richardson P.C.

(57) ABSTRACT

Methods, systems, and apparatus, including computer programs encoded on computer storage media, for caching data not frequently accessed. One of the methods includes receiving a request for data from a component of a device, determining that the data satisfies an infrequency condition, in response to determining that the data satisfies the infrequency condition: determining a target cache level which defines a cache level within a cache level hierarchy of a particular cache at which to store infrequently accessed data, the target cache level being lower than a highest cache level in the cache level hierarchy, requesting and receiving the data from a memory that is not a cache of the device, and storing the data in a level of the particular cache that is at or below the target cache level in the cache level hierarchy, and providing the data to the component.

20 Claims, 3 Drawing Sheets

(56) References Cited

U.S. PATENT DOCUMENTS

2015/0032968 A1   1/2015   Heidelberger
2016/0147666 A1   5/2016   Li et al.

OTHER PUBLICATIONS

Amit, Nadav et al., "IOMMU: Strategies for Mitigating the IOTLB Bottleneck", ISCA 2010, Proceedings of the 2010 International Conference on Computer Architecture, (ISCA '10) 12 pages.

Bhargava, Ravi et al., "Accelerating Two-Dimensional Page Walks for Virtualized Systems", ASPLOS XIII, Proceedings of the 13th International Conference on Architectural Support for Programming Languages and Operating Systems, 2008, 10 pages.

Hoang, Giang et al., "A Case for Alternative Nested Paging Models for Virtualized Systems", Computer Architecture Letters, vol. 9, issue 1, 2010, 4 pages.

Jiminez, Daniel A., "Insertion and Promotion for Tree-Based PseudoLRU Last-Level Caches", Proceedings of the 46th Annual IEEE/ACM International Symposium on Microarchitecture, 2013, 13 pages.

Silberschatz, Avi et al., "Operating System Concepts", Chapters 8 and 9, 8th edition, 2009 John Wiley & Sons, Inc., Hoboken, NJ, 121 pages.

International Search Report and Written Opinion in International Application No. PCT/US2016/030032, mailed Jun. 29, 2016, 10 pages.

\* cited by examiner

DATA CACHING

BACKGROUND

This specification relates to caching data.

Devices may include a cache to store recently accessed data or data that is expected to be accessed. For instance, a processor may include one or more cache levels. A highest cache level, e.g., an L1 cache, may be the fastest cache in a cache level hierarchy and the smallest cache, e.g., compared to a larger and slower L3 cache positioned lower in the cache level hierarchy.

SUMMARY

In some implementations, a system can specify at which cache level nested page tables, e.g., for virtual machines, or other infrequently accessed data are stored. The cache level may be changed on the fly to reduce the cache miss rate. Storing nested page tables and other infrequently accessed data at a particular cache level may allow a processor to access the infrequently accessed memory in a slower memory, e.g., a L3 cache, while not moving the infrequently accessed data up in a cache level hierarchy and ejecting data stored in a faster memory that is more likely to be accessed.

In general, one innovative aspect of the subject matter described in this specification can be embodied in methods that include the actions of receiving a request for data from a component of a device, determining that the data satisfies an infrequency condition, in response to determining that the data satisfies the infrequency condition: determining a target cache level which defines a cache level within a cache level hierarchy of a particular cache at which to store infrequently accessed data, the target cache level being lower than a highest cache level in the cache level hierarchy, requesting and receiving the data from a memory that is not a cache of the device, and storing the data in a level of the particular cache that is at or below the target cache level in the cache level hierarchy, and providing the data to the component. Other embodiments of this aspect include corresponding computer systems, apparatus, and computer programs recorded on one or more computer storage devices, each configured to perform the actions of the methods.

In general, one innovative aspect of the subject matter described in this specification can be embodied in methods that include the actions of receiving a request for data from a component of a device, determining that the data satisfies an infrequency condition, in response to determining that the data satisfies the infrequency condition: determining a target cache level which defines a cache level within a cache level hierarchy of a particular cache at which to store infrequently accessed data, the target cache level being lower than a highest cache level in the cache level hierarchy, requesting and receiving the data from a memory that is not a cache of the device, storing the data in a level of the particular cache that is at or below the target cache level in the cache level hierarchy, storing, in a particular level of the particular cache that is above the target cache level in the cache level hierarchy, and the data in a least recently used cache line of the particular level and not updating a least recently used bit for the least recently used cache line, and providing the data to the component. Other embodiments of this aspect include corresponding computer systems, apparatus, and computer programs recorded on one or more computer storage devices, each configured to perform the actions of the methods.

In general, one innovative aspect of the subject matter described in this specification can be embodied in methods that include the actions of receiving, by a cache, a request for data from a component of a device, determining that the data satisfies a particular pattern, in response to determining that the data satisfies the particular pattern: determining a target cache level which defines a cache level within a cache level hierarchy of the cache at which to store data, requesting and receiving the data from a memory that is not a cache of the device, and storing the data in the target cache level without storing the data in all of the cache levels of the cache, and providing the data to the component. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, receiving the request for data from the component of the device may include receiving the request for the data from a processor of a device and providing the data to the component may include providing the data to the processor. Receiving the request for data from the component of the device may include receiving the request for the data from a memory controller of a device, and providing the data to the component may include providing the data to the memory controller. Receiving the request for data from the component of the device may include receiving the request for the data from a memory management unit of a device, and providing the data to the component may include providing the data to the memory management unit. Receiving the request for data from the component of the device may include receiving the request for the data from a input/output unit of a device, and providing the data to the component may include providing the data to the input/output unit.

In some implementations, the method may include determining that the request for the data includes a request for a nested page table. Determining that the data satisfies the infrequency condition may include determining that the data satisfies the infrequency condition in response to determining that the request for the data includes a request for a nested page table. The method may include receiving input indicating an identifier for the target cache level. Receiving the input indicating the identifier for the target cache level may include receiving the input from a Basic Input/Output System or a Unified Extensible Firmware Interface. Receiving the input indicating the identifier for the target cache level may include receiving an indication of the input from an administrator.

In some implementations, determining the target cache level may include automatically determining the target cache level using a cache miss rate for the particular cache. Automatically determining the target cache level using the cache miss rate for the particular cache may include determining that the cache miss rate for the particular cache does not satisfy a threshold miss rate, and changing the target cache level to a lower cache level in the cache level hierarchy in response to determining that the cache miss rate for the particular cache does not satisfy the threshold miss rate. Automatically determining the target cache level using the cache miss rate for the particular cache may include determining that the cache miss rate for the particular cache satisfies a threshold miss rate, and changing the target cache higher to a lower cache level in the cache level hierarchy in response to determining that the cache miss rate for the particular cache satisfies the threshold miss rate. The method may include receiving a second request from the processor for second data, determining that the second data satisfies the infrequency condition, determining an updated target cache level which defines a cache level within the cache level hierarchy of the particular cache at which to store infrequently accessed data, the updated target cache level being lower than the highest cache level in the cache level hierarchy, requesting and receiving the second data from another memory that is not a cache of the device, storing the second data in a level of the particular cache that is at or below the updated target cache level in the cache level hierarchy, and providing the second data to the processor.

In some implementations, receiving the request for the data from the processor may include receiving the request from the processor during execution of a first virtual machine, and determining the target cache level may include determining a first target cache level specific to the first virtual machine. The method may include receiving a second request for second data from the processor during execution of a second virtual machine, determining that the second data satisfies a second infrequency condition, determining a second target cache level specific to the second virtual machine, the second target cache level defining a cache level within the cache level hierarchy of the particular cache at which to store infrequently accessed data, the second target cache level being lower than the highest cache level in the cache level hierarchy, requesting and receiving the second data from another memory that is not a cache of the device, storing the second data in a level of the particular cache that is at or below the second target cache level in the cache level hierarchy, and providing the second data to the processor. Determining the first target cache level specific to the first virtual machine may include determining the first target cache level using data stored in a first register of the device, and determining the second target cache level specific to the second virtual machine may include determining the second target cache level using data stored in a second, different register of the device.

In some implementations, determining the target cache level may include identifying an attribute of the data after receiving the data from the memory, and using the attribute to determine that the data satisfies the infrequency condition and determine the target cache level at which to store the data. The method may include receiving a second request for second data from the processor, determining that the second data satisfies a second infrequency condition, requesting and receiving the second data from a second memory that is not a cache of the device, determining, after receiving the second data from the second memory, a second target cache level which defines a cache level within the cache level hierarchy of the particular cache at which to store infrequently accessed data, the target cache level being lower than the highest cache level in the cache level hierarchy using a second attribute of the second data, storing the second data in a level of the particular cache that is at or below the target cache level in the cache level hierarchy, and providing the second data to the processor. The method may include receiving a second request for the data, and retrieving the data from the level of the particular cache in which the data was stored while ensuring that the data is not stored in another level of the cache that is above the target cache level in the cache level hierarchy.

The subject matter described in this specification can be implemented in particular embodiments and may result in one or more of the following advantages. In some implementations, the systems and methods described below may decide what data to store at a target cache level using an infrequency condition so that less frequently used data is stored in a larger, slower cache level and not a smaller, faster cache level, e.g., which may cause the eviction of data that will be used soon from the smaller, faster cache level. In some implementations, the systems and methods described below may use a frequency condition or a pattern of data to determine a target cache level at which to store data, e.g., to store the frequently used data in a smaller, faster cache level and not a larger, slower cache level or a particular cache level. In some implementations, a system that stores infrequently accessed data in some cache levels, dynamically adjusts a target cache level, or both, may improve cache hit rates for other data. For instance, the system may increase a cache hit rate for execution of a virtual machine when nested page tables for the virtual machine are not stored in the L1 cache or when a least recently used bit for an L1 cache line in which the nested page tables are stored is not updated. The systems and methods described below may have reduced power consumption over systems that do not implement such cache management.

The systems and methods described below may suppress denial-of-service attacks from malicious virtual machines. For instance, when a system receives multiple requests from a virtual machine for data that is infrequently accessed and not stored in the cache, the system may suppress a denial-of-service attack by storing the requested data only in a lower level cache, e.g., an L3 cache, provide more efficient caching, more fair caching, or two or more of these. The systems and method described below may be implemented without significant hardware changes or any hardware changes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
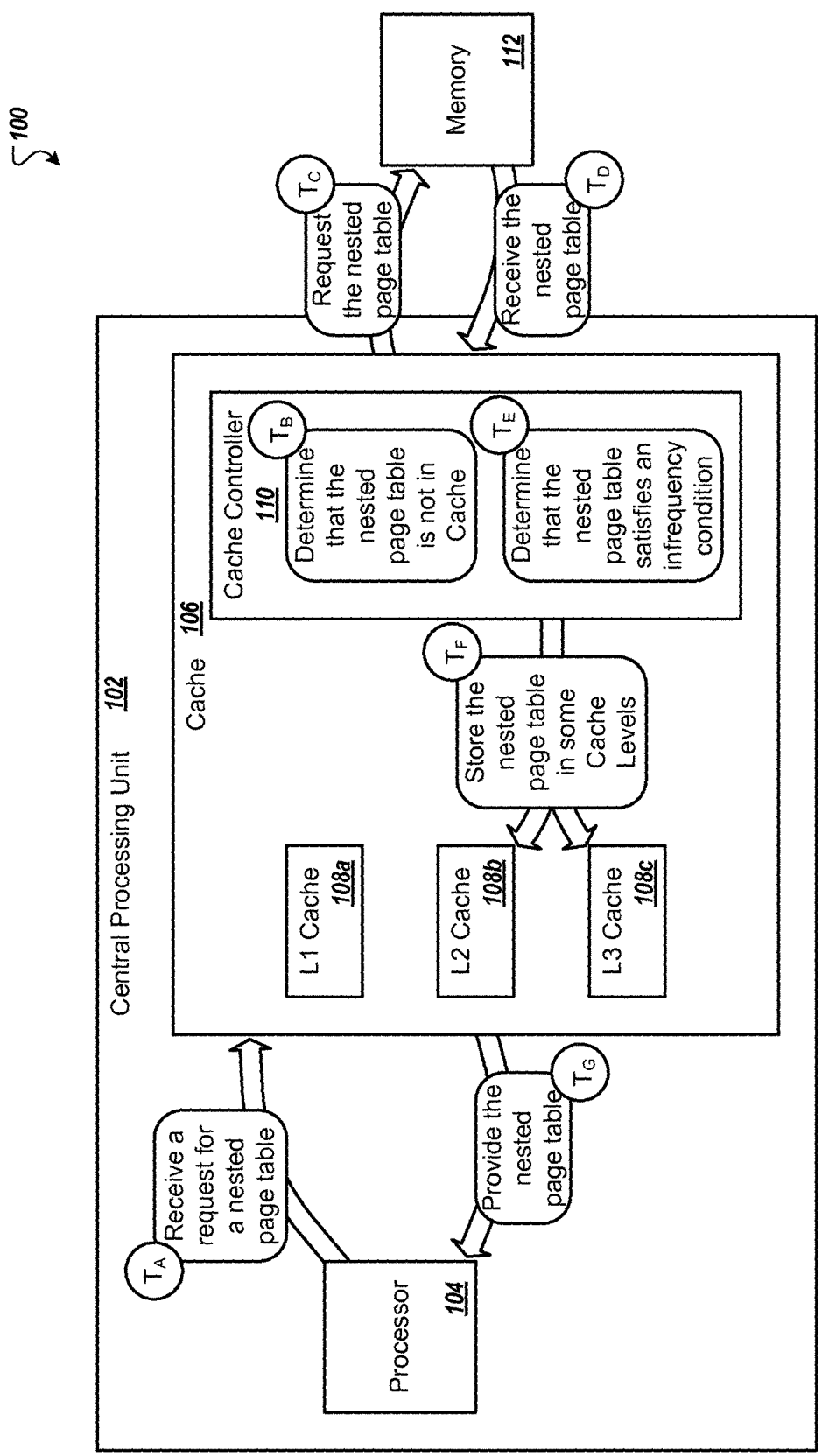
FIG. 1 is an example of a system in which a central processing unit includes a target cache level at which to store particular data.

Some operating systems, such as Linux, use virtual memory that the operating system maps to physical addresses and allows applications to operate on virtual addresses. An operating system may maintain a virtual address to physical address mapping in page tables that are hidden from applications to provide the illusion that an application owns a contiguous block of memory, all memory, or both. A physical machine executing an operating system may cache part of a page table, e.g., in a transition lookaside buffer (TLB), and automate replenishment of the page table in the cache, e.g., the TLB, to accelerate this virtual to physical translation.

In a virtualized environment, e.g., a cloud environment, virtual machines add another layer to this translation. For instance, a virtual machine uses a virtual machine virtual address which the physical machine will translate to a virtual machine physical address and then to host physical address, e.g., for the physical machine. To accelerate this translation, upon a TLB miss, a page walker may perform nested page walking to replenish the TLB with the virtual machine virtual address to host physical address mapping. Sometimes, the use of nested page tables to determine the virtual machine virtual address to host physical address mapping may inadvertently evict useful data stored in a cache, e.g., that the physical hardware would use during the execution of the virtual machine.

In some implementations, a system may designate a target cache level at which to store nested page tables and other infrequently accessed data and enforce the target cache level designation when storing data in a cache. For example, the system may determine the target cache level using a Basic Input/Output System (BIOS) setting that allows a user, e.g., an administrator, to designate a particular cache level, e.g., L1, L2, L3, etc., as the target cache level at which to store infrequently accessed data. The system may determine the target cache level at boot time and apply the target cache level to infrequently accessed data during execution of the operating system, e.g., regardless of an address range used by a virtual machine or an application which requested the infrequently accessed data.

In some examples, the system may store the infrequently accessed data in all levels at and below the target cache level while not storing the infrequently accessed data in any cache level above the target cache level. For instance, when a processor includes a three level cache hierarchy and the target cache level is L2, the system may store infrequently accessed data in the L2 cache and the L3 cache but not the L1 cache.

For example, the cache level hierarchy defines a highest level of the cache as the smallest or fastest, or smallest and fastest, level of the cache, e.g., the L1 cache. The cache level hierarchy defines the other cache levels as lower cache levels that are slower or larger or both slower and larger than the highest level of the cache, e.g., the L2 cache and the L3 cache. For instance, the highest level of the cache, e.g., the L1 cache, is above the lower levels of the cache and the lower levels of the cache, e.g., the L2 cache and the L3 cache, are below the highest cache level in the cache level hierarchy. A middle cache level, e.g., the L2 cache, is below the highest cache level, e.g., the L1 cache, and above the lowest cache level, e.g., the L3 cache. Is some examples, the target cache level is the middle cache level or the lowest cache level when the cache level hierarchy includes three cache levels.

These features and additional features are described in more detail below.

FIG. 1 is an example of a system 100 in which a central processing unit 102 includes a target cache level at which to store particular data. The particular data may be infrequently accessed data, such as nested page tables. For example, a processor 104 may provide, at time $T_A$, a request for a nested page table to a cache 106. The cache 106 receives the request and determines whether the requested nested page table is in a particular cache level 108a-c of the cache 106. For instance, a cache controller 110 determines, at time $T_B$, that the requested nested page table is not stored in the cache 106.

The cache 106, e.g., the cache controller 110, requests, at time $T_C$, the nested page table from a memory 112, e.g., a random access memory. At time $T_D$, the cache 106 receives the nested page table from the memory 112.

The cache controller 110 determines, at time $T_E$, that the nested page table satisfies an infrequency condition. Satisfaction of the infrequency condition indicates that data is accessed at such an infrequent rate that it should only be stored in the cache at a level no higher than a target cache level. The infrequency condition can be met by the data being of a particular type, or from a particular source, or being accessed at less than a threshold rate. For instance, the cache controller 110 determines that the received data is a nested page table or another type of infrequently accessed data, e.g., using one or more attributes of the data. The data being the nested page table satisfies the infrequency condition.

The cache controller 110 determines a target cache level for the infrequently accessed data, e.g., using the attributes of the data or a system variable that identifies the target cache level and, at time $T_F$, stores the nested page table in some cache levels. For instance, the cache 106 determines that the target cache level is the L2 cache 108b and stores the received nested page table in the L2 cache 108b and the L3 cache 108c but not the L1 cache 108a.

At time $T_G$, the cache 106 provides the requested nested page table to the processor 104. For instance, the cache 106 provides the data from the L2 cache 108b to the processor 104 for execution of an application, e.g., a virtual machine.

When the processor 104 later requests the same nested page table, e.g., as the nested page table requested at time $T_A$, and that nested page table is still stored in at least one cache level of the cache 106, e.g., the L3 cache 108c or both the L2 cache 108b and the L3 cache 108c, the cache 106 provides the nested page table to the processor 104 without storing the nested page table in a level of the cache level hierarchy higher than the target cache level, e.g., without storing the nested page table in the L1 cache 108a. For example, the cache 106 may determine that the nested page table is stored in the L3 cache 108c, store the nested page table in the L2 cache 108b, and provide the nested page table to the processor 104, e.g., without storing the nested page table in the L1 cache 108a.

In some implementations, the system 100 performs the actions in sequential order, e.g., $T_A$, $T_B$, and so on. In some implementations, the system 100 may perform one or more of the actions in an order different than the order described here. For instance, the cache controller 110 may determine that the nested page table is not in the cache and then determine that the nested page table satisfies the infrequency condition.

In some implementations, the system 100 may store the infrequently accessed data in a cache level above the target cache level, e.g., may store the infrequently accessed data in a cache line of the L1 cache, and not update data indicating that the infrequently accessed data was stored in the cache level. For instance, the system 100 might not update the least recently used (LRU) bit in the L2 cache, e.g., to reduce the chance for temporal reuse. The system 100 may store the data in the target cache level and any levels below the target cache level in a cache level hierarchy in the normal manner, e.g., by updating the LRU bit.

In some examples, the system 100 may store the infrequently accessed data in a LRU position of a particular cache level. In some examples, the system 100 may store the infrequently accessed data in a most recently used position of a particular cache. In some examples, the system 100 may use a statically configurable or dynamic Nth recently used position to store the infrequently accessed data. The system 100 may use a different method to determine a position at which to store the infrequently accessed data for each cache level, e.g., at which the infrequently accessed data is stored in a cache line.

The system 100 may determine the position at which to store the infrequently accessed data for each piece of data. For instance, the cache 106 may determine that a first cache line is a least recently used cache line for first infrequently accessed data and then, later, determine that a second cache line is a least recently used cache line for second infrequently accessed data. The cache 106 may store the particular infrequently accessed data in the corresponding cache line.

In some implementations, the system 100 may include multiple target cache levels each for a specific an address range. For instance, the central processing unit 102 may provide an instruction to set the address range and the associated cache level. A virtual machine monitor may receive the instruction and use the instruction to apply different target cache levels to each address range. In some examples, the cache controller 110 may store this range information. When the cache controller 110 receives a data request for a nested page table, the cache controller 110 may determine whether an address for the nested page table falls within the address range. If the cache controller 110 determines that the address falls within the address range, the cache controller 110 uses the target cache level to enforce the request, e.g., the cache level or levels at which the nested page table is stored.

In some implementations, the system 100 may identify the target cache level using an attribute, e.g., metadata, of requested data that identifies a memory type. For instance, the central processing unit 102 may use "WC_L2" as a memory type to indicate that an L2 cache is the target cache level. Based on the memory type of requested data, e.g., a page that stores nested page tables, the system 100 can change the target cache level, e.g., when different requested data have different memory types that identify different target cache levels.

In some implementations, the system 100 may store the target cache level in a register, e.g., of the cache 106 or the processor 104. The cache 106 may access the register to determine the target cache level. The processor 104 or another component of the central processing unit 102 may update the value of the register for each application executed by the processor 104, e.g., when the processor 104 begins executing a virtual machine, or dynamically in response to a cache miss rate of the cache 106.

In some implementations, all of the cache entries in the cache 106, e.g., the cache lines in the different cache levels 108*a-c* are all of the same size. For example, the system 100 may, at least in part, or may not determine that data is infrequently used based on the size of the data. In some examples, the system 100 stores data in the highest cache level, e.g., the L1 cache, that is the same size as the infrequently accessed data.

In some implementations, the system 100 may dynamically determine a target cache level, e.g., based on a cache miss rate of the cache 106. The system 100 may move the target cache level to a lower level in a cache level hierarchy when a cache miss rate does not satisfy, e.g., is above, a threshold cache miss rate. For instance, when the threshold cache miss rate is three percent and the cache miss rate is five percent, the system 100 may move the target cache level to a lower level in the cache level hierarchy. The system 100 may move the target cache level to a higher level in a cache level hierarchy when a cache miss rate satisfies, e.g., is equal to or below, a threshold cache miss rate. For instance, when the threshold cache miss rate is three percent and the cache miss rate is three percent or two percent, the system 100 may move the target cache level to a higher level in the cache level hierarchy. The system 100 may use any appropriate method to automatically determine and dynamically determine the target cache level for the cache 106.

In some implementations, the system 100 may determine a target cache level for frequently used data. The target cache level may be a lowest cache level at which to store the frequently accessed data. For instance, the frequently accessed data may be stored in an L1 cache and not an L2 cache or an L3 cache.

In some implementations, the system 100 may determine whether data satisfies, e.g., matches, a particular pattern and, if the data satisfies the particular pattern, determined a target cache level at which to store the data. The data may be of a particular type defined by a pattern, the access to the data may satisfy a pattern, or the data may satisfy a pattern in another appropriate manner. For instance, the system 100 may use the particular pattern to determine that the data is streaming data, e.g., based on an attribute of the data or an application or device accessing the data. The attribute of the data may be an address of the data, e.g., and the system 100 may determine that multiple sequential addresses are being accessed in sequence by the processor 104. The system 100 may use a particular pattern, or multiple patterns, to determine whether the data falls into a threat category, e.g., spoofing of a user's identity, tampering, a repudiation, an information disclosure such as a privacy breach or data leak, a denial of service, or an elevation of privilege. In some examples, the system 100 may use a particular pattern to determine whether the data is part of scatter-gather data access, e.g., in which a device writes data from multiple buffers into a single data stream or reads data from a data stream into multiple buffers. The system 100 may use a source or a destination address of the data to determine whether the data satisfies the pattern.

In these implementations, the system 100 may store the data in the target cache level and one or more lower levels in a cache level hierarchy, in the target cache level and one or more higher levels in the cache level hierarchy, or only in the target cache level. The system 100 may use particular patterns that are predetermined, e.g., by an administrator or data analysis, or dynamic, e.g., determined using a machine learning process. The system 100 may use any appropriate method, pattern, or both, to determine whether to store data in a target cache level.

Figure 2:
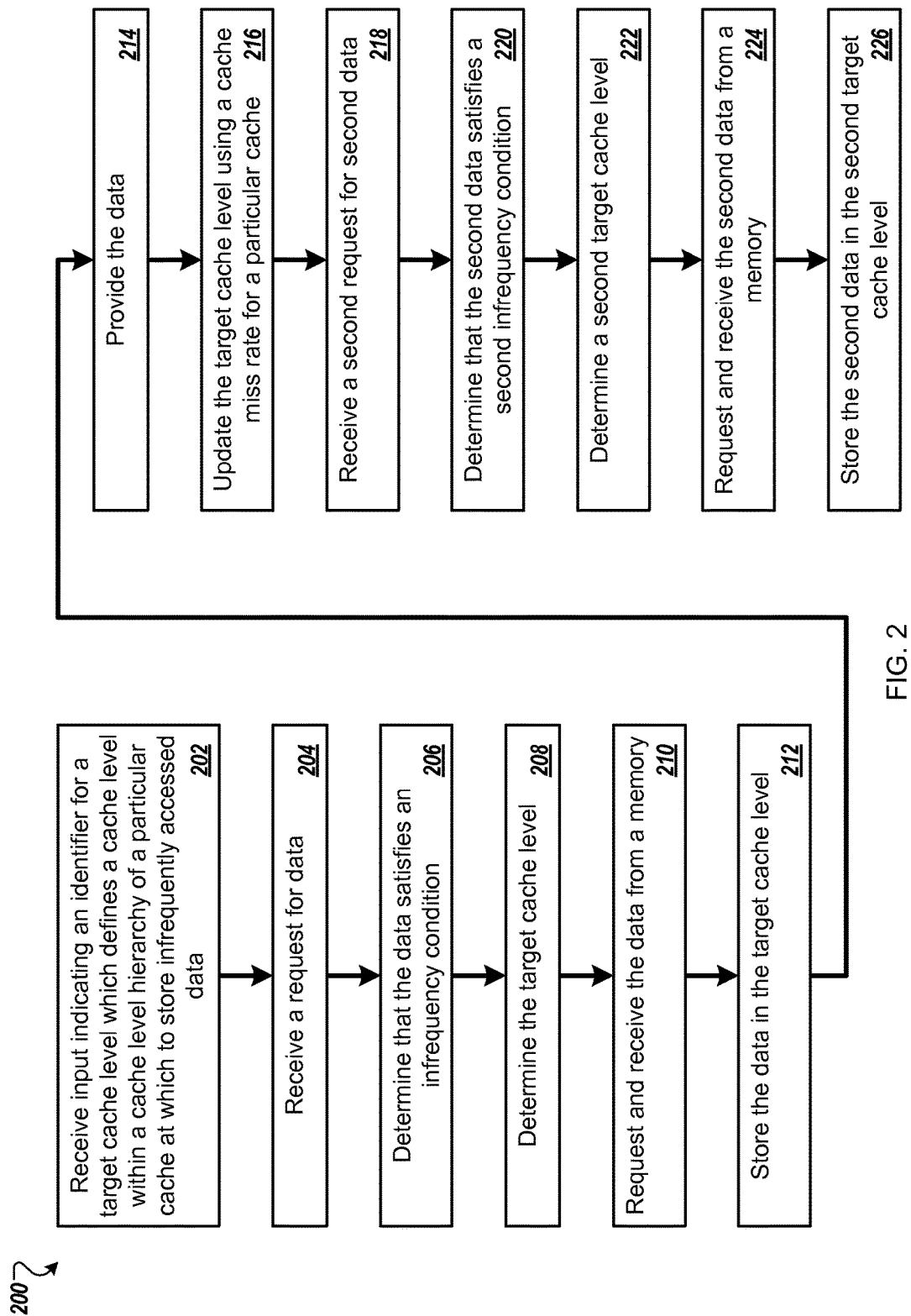
FIG. 2 is a flow diagram of a process for storing data in a target cache level.

FIG. 2 is a flow diagram of a process 200 for storing data in a target cache level. For example, the process 200 can be used by the cache 106 from the system 100.

A cache receives input indicating an identifier for a target cache level which defines a cache level within a cache level hierarchy of a particular cache at which to store infrequently accessed data (202). For instance, a system may receive the identifier from an administrator and provide the identifier to the cache. The identifier may be for a specific application or type of application or for all applications. For example, the identifier may apply to all virtual machines or a particular virtual machine.

In some implementations, a system may present a user interface to an administrator that allows the administrator to define the target cache level. The user interface may include one or more fields that allow the administrator to specify specific applications, application types, or groups of applications and corresponding target cache levels.

The cache receives a request for data (204). For instance, the cache receives the request from a processor, e.g., executing a virtual machine. In some examples, the cache receives the request from a memory controller, a memory management unit, an input/output unit, an integrated input/output unit, e.g., on a die, or another component of a device.

The cache determines that the data satisfies an infrequency condition (206). For example, the cache determines a type of the data and determines whether the type of the data satisfies the infrequency condition. In some examples, the cache may determine frequency values for different types of data automatically, e.g., based on accesses to that type of data stored in the cache. Here the infrequency condition may be an access frequency value threshold, and if the frequency value for data is below the frequency value threshold, then the infrequency condition is determined to be met.

The cache determines the target cache level (208). For instance, the cache determines the target cache level, specific to a particular application or type of application executing on the processor and for which the data was requested.

The cache requests and receives the data from a memory (210). The memory may be any appropriate type of memory, such as a random access memory.

The cache stores the data in the target cache level (212). The cache may store the data in one or more levels below target cache level, e.g., using a cache level hierarchy. For instance, the cache may store the data in only an L2 cache. In some examples, the cache may store the data in an L2 cache and an L3 cache and, optionally, any additional lower cache levels. The cache may store the data in the target cache level without storing the data in a cache level higher than the target cache level in a cache level hierarchy.

In some implementations, the cache stores the infrequently accessed data in a cache level higher than the target cache level in a cache level hierarchy. In these implementations, the cache does not update a bit that indicates that a cache line, in which the infrequently accessed data is stored, has been updated in the cache level higher than the target cache level in the cache level hierarchy. For instance, the cache does not update a least recently used (LRU) but or a most recently used (MRU) bit.

In some implementations, the cache may determine which cache line will be overwritten next in a particular cache level and store the infrequently accessed data in that cache line. The cache might not update a bit that indicates that the cache line was overwritten. The cache may use any appropriate method to determine which cache line will be overwritten next.

The cache provides the data (214). For instance, the cache may provide the data to the processor. In some examples, the cache provides the data to a requesting component, e.g., when the cache is included in a memory such as a hard disk drive.

The cache updates the target cache level using a cache miss rate for a particular cache (216). For instance, the cache may dynamically and automatically determine the cache miss rate and update the target cache level for a particular application, type of application, or for all applications executing on a device.

The target cache level is specific to a particular central processing unit. For example, when a device includes two central processing units, the device includes one target cache level for each of the central processing units. In some examples, each processor core of a single central processing unit may have a different target cache level. In some examples, one or more processor cores on a single central processing unit may use the same target cache level. For instance, two processor cores may share the same target cache level such that when the target cache level changes for one of the two processor cores, the target cache level changes for the other of the two processor cores.

The cache receives a second request for second data (218). The second data may be for the execution of the same application as the data requested in step 204 or may be for a different application. In some examples, the data requested in step 204 is for a first virtual machine and the second data is for a second virtual machine.

The cache determines that the second data satisfies a second infrequency condition (220). The second infrequency condition may be the same as the infrequency condition used in step 206 or may be a different infrequency condition. For example, the cache may have different conditions or thresholds for different virtual machines or the same condition or threshold for all virtual machines or multiple virtual machines.

The cache determines a second target cache level (222). The second target cache level may be different than the target cache level or may be the same.

The cache requests and receive the second data from a memory (224). For instance, the cache may request the second data from the same memory accessed in step 210 or a different memory.

The cache stores the second data in the second target cache level (226). The cache may provide the second data to a requesting device, e.g., a processor.

The order of steps in the process 200 described above is illustrative only, and storing the data in the target cache level can be performed in different orders. For example, the cache may receive a request for data, request and receive the data from a memory, and then determine whether the data satisfies an infrequency condition and, if so, the target cache level.

In some implementations, the process 200 can include additional steps, fewer steps, or some of the steps can be divided into multiple steps. For example, the cache may request the data from the memory and not receive the data from the memory. In some examples, the cache may perform only steps 204 through 212 or 202 through 214, or some other subset of the steps for the process 200.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Figure 3:
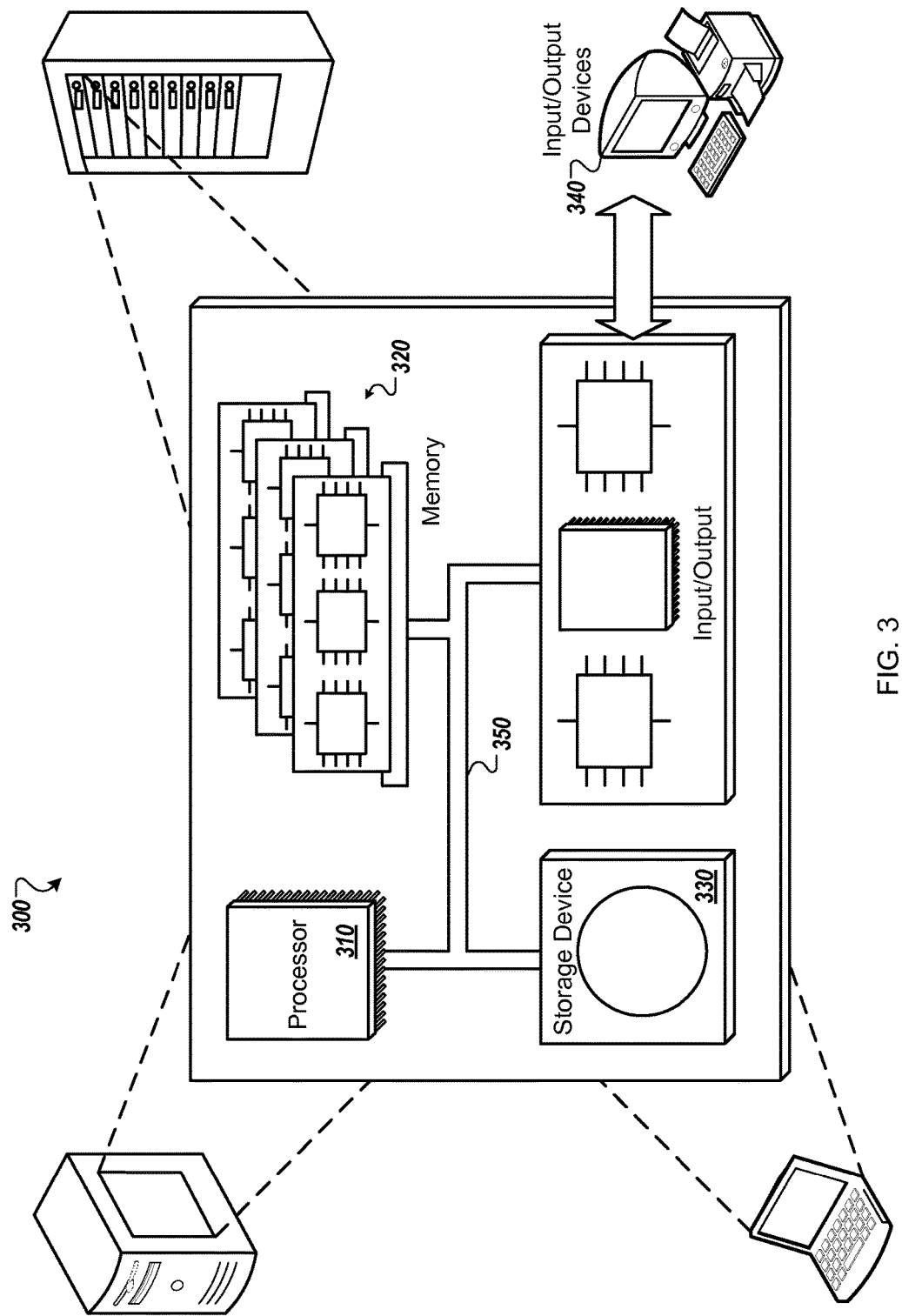
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In some implementations, one component, a subset of the components, or all of the above hardware components may be replaced with equivalent software or hybrid components that implement the same functionality.

What is claimed is:

1. A computer-implemented method comprising:
receiving a request for data from a component of a device;
determining that the data is accessed less than a threshold rate and that the data should only be stored in a cache at a level no higher than a target cache level;
in response to determining that the data is accessed less than the threshold rate and that the data should only be stored in a cache at a level no higher than the target cache level:
  determining the target cache level which defines a cache level within a cache level hierarchy of a particular cache at which to store data that is accessed less than the threshold rate, the target cache level being lower than a highest cache level in the cache level hierarchy;
  requesting and receiving the data from a memory that is not a cache of the device;
  storing the data in a level of the particular cache that is at or below the target cache level in the cache level hierarchy; and
  storing, in a particular level of the particular cache that is above the target cache level in the cache level hierarchy, the data in a particular cache line of the particular level that is a least recently used cache line identified by a least recently used bit for the particular level in the cache level hierarchy and not updating the least recently used bit so that the least recently used bit does not indicate that the particular cache line has been updated to include the data; and
providing the data to the component.

2. The method of claim 1, wherein:
receiving the request for data from the component of the device comprises receiving the request for the data from a processor of a device; and
providing the data to the component comprises providing the data to the processor.

3. The method of claim 1, wherein:
receiving the request for data from the component of the device comprises receiving the request for the data from a memory controller of a device; and
providing the data to the component comprises providing the data to the memory controller.

4. The method of claim 1, wherein:
receiving the request for data from the component of the device comprises receiving the request for the data from a memory management unit of a device; and
providing the data to the component comprises providing the data to the memory management unit.

5. The method of claim 1, wherein:
receiving the request for data from the component of the device comprises receiving the request for the data from a input/output unit of a device; and
providing the data to the component comprises providing the data to the input/output unit.

6. The method of claim 1, comprising receiving, from a Basic Input/Output System or a Unified Extensible Firmware Interface, input indicating an identifier that specifies the target cache level within the cache level hierarchy at which to store data that is accessed less than the threshold rate.

7. The method of claim 1, comprising receiving an indication of input from an administrator indicating an identifier that specifies the target cache level within the cache level hierarchy at which to store data that is accessed less than the threshold rate.

8. The method of claim 1, wherein determining the target cache level comprises:
identifying an attribute of the data after receiving the data from the memory; and
using the attribute to determine that the data is accessed less than the threshold rate and determine the target cache level at which to store the data.

9. The method of claim 8, comprising:
receiving a second request for second data from the component of the device;
determining that the second data is accessed less than a second threshold rate and that the data should only be stored in a cache at a level no higher than a second target cache level, the second threshold rate being a different threshold rate than the threshold rate;
requesting and receiving the second data from a second memory that is not a cache of the device;
determining, after receiving the second data from the second memory and using a second attribute of the second data, the second target cache level which defines a cache level within the cache level hierarchy of the particular cache at which to store data that is accessed less than a second threshold rate, the second target cache level being lower than the highest cache level in the cache level hierarchy and the second target cache level being a different cache level than the target cache level;
storing the second data in a level of the particular cache that is at or below the second target cache level in the cache level hierarchy; and
providing the second data to the component of the device.

10. The method of claim 1, comprising:
receiving a second request for the data; and
retrieving the data from the level of the particular cache in which the data was stored while ensuring that the data is not stored in another level of the cache that is above the target cache level in the cache level hierarchy.

11. A computer-implemented method comprising:
receiving a request for data from a component of a device;
determining that the request for the data comprises a request for a nested page table;
determining that the data is accessed less than a threshold rate and that the data should only be stored in a cache at a level no higher than a target cache level in response to determining that the request for the data comprises a request for a nested page table;

in response to determining that the data is accessed less than the threshold rate and that the data should only be stored in a cache at a level no higher than a target cache level:

determining the target cache level which defines a cache level within a cache level hierarchy of a particular cache at which to store data that is accessed less than the threshold rate, the target cache level being lower than a highest cache level in the cache level hierarchy;

requesting and receiving the data from a memory that is not a cache of the device; and storing the data in a level of the particular cache that is at or below the target cache level in the cache level hierarchy; and providing the data to the component.

12. A computer-implemented method comprising:

receiving a request for data from a component of a device;

determining that the data is accessed less than a threshold rate and that the data should only be stored in a cache at a level no higher than a target cache level;

in response to determining that the data is accessed less than the threshold rate and that the data should only be stored in a cache at a level no higher than a target cache level:

automatically determining the target cache level using a cache miss rate for a particular cache, the target cache level defining a cache level within a cache level hierarchy of the particular cache at which to store data that is accessed less than the threshold rate and is lower than a highest cache level in the cache level hierarchy;

requesting and receiving the data from a memory that is not a cache of the device; and storing the data in a level of the particular cache that is at or below the target cache level in the cache level hierarchy; and providing the data to the component.

13. The method of claim 12, wherein automatically determining the target cache level using the cache miss rate for the particular cache comprises:

determining that the cache miss rate for the particular cache does not satisfy a threshold miss rate; and changing the target cache level to a lower cache level in the cache level hierarchy in response to determining that the cache miss rate for the particular cache does not satisfy the threshold miss rate.

14. The method of claim 12, wherein automatically determining the target cache level using the cache miss rate for the particular cache comprises:

determining that the cache miss rate for the particular cache satisfies a threshold miss rate; and changing the target cache level to a higher cache level in the cache level hierarchy in response to determining that the cache miss rate for the particular cache satisfies the threshold miss rate.

15. The method of claim 12, comprising:

receiving a second request from the component of the device for second data;

determining that the second data is accessed less than the threshold rate and that the data should only be stored in a cache at a level no higher than a target cache level;

determining an updated target cache level which defines a cache level within the cache level hierarchy of the particular cache at which to store data that is accessed less than the threshold rate, the updated target cache level being lower than the highest cache level in the cache level hierarchy;

requesting and receiving the second data from another memory that is not a cache of the device;

storing the second data in a level of the particular cache that is at or below the updated target cache level in the cache level hierarchy; and providing the second data to the component of the device.

16. A computer-implemented method comprising:

receiving a first request for first data from a component of a device during execution of a first virtual machine;

determining that the first data is accessed less than a first threshold rate and that the first data should only be stored in a cache at a level no higher than a first target cache level;

in response to determining that the first data is accessed less than the first threshold rate and that the first data should only be stored in a cache at a level no higher than the first target cache level:

determining the first target cache level specific to the first virtual machine, the first target cache level defining a cache level within a cache level hierarchy of a particular cache at which to store data that is accessed less than the first threshold rate and is lower than a highest cache level in the cache level hierarchy;

requesting and receiving the first data from a memory that is not a cache of the device; and storing the first data in a level of the particular cache that is at or below the first target cache level in the cache level hierarchy;

providing the data to the component;

receiving a second request for second data from the component of the device during execution of a second virtual machine;

determining that the second data is accessed less than a second threshold rate and that the second data should only be stored in a cache at a level no higher than a second target cache level;

determining the second target cache level specific to the second virtual machine, the second target cache level defining a cache level within the cache level hierarchy of the particular cache at which to store data that is accessed less than the second threshold rate, the second target cache level being lower than the highest cache level in the cache level hierarchy;

requesting and receiving the second data from another memory that is not a cache of the device;

storing the second data in a level of the particular cache that is at or below the second target cache level in the cache level hierarchy; and providing the second data to the component of the device.

17. The method of claim 16, wherein:

determining the first target cache level specific to the first virtual machine comprises determining the first target cache level using data stored in a first register of the device; and determining the second target cache level specific to the second virtual machine comprises determining the second target cache level using data stored in a second, different register of the device.

18. A non-transitory computer readable storage medium storing instructions, which are executable by a data processing apparatus and, upon such execution, cause the data processing apparatus to perform operations comprising:
receiving a request for data from a component of a device;
determining that the data is accessed less than a threshold rate and that the data should only be stored in a cache at a level no higher than a target cache level;
in response to determining that the data is accessed less than the threshold rate and that the data should only be stored in a cache at a level no higher than a target cache level:
determining the target cache level which defines a cache level within a cache level hierarchy of a particular cache at which to store data that is accessed less than the threshold rate, the target cache level being lower than a highest cache level in the cache level hierarchy;
requesting and receiving the data from a memory that is not a cache of the device;
storing the data in a level of the particular cache that is at or below the target cache level in the cache level hierarchy; and
storing, in a particular level of the particular cache that is above the target cache level in the cache level hierarchy, the data in a particular cache line of the particular level that is a least recently used cache line identified by a least recently used bit for the particular level in the cache level hierarchy and not updating the least recently used bit so that the least recently used bit does not indicate that the particular cache line has been updated to include the data; and
providing the data to the component.

19. The computer readable storage medium of claim 18, the operations comprising:
receiving a second request for second data from a second component of the device;
determining that the second data is not stored in the particular level of the particular cache that is above the target cache level in the cache level hierarchy;
determining that the least recently used bit for the particular level identifies the particular cache line; and
storing the second data in the particular cache line of the particular level of the particular cache in response to determining that the least recently used bit for the particular level identifies the particular cache line.

20. A system, comprising:
a cache; and
a non-transitory computer readable storage medium in data communication with the cache and storing instructions, which are executable by the cache and, upon such execution, cause the cache to perform operations comprising:
receiving, by the cache, a request for data from a component of a device;
determining that the data satisfies a particular pattern and that the data should be stored in a target cache level within a cache level hierarchy of the cache without storing the data in all cache levels of the cache level hierarchy;
in response to determining that the data satisfies the particular pattern and that the data should be stored in the target cache level within the cache level hierarchy of the cache without storing the data in all of the cache levels of the cache level hierarchy:
determining the target cache level which defines a cache level within the cache level hierarchy of the cache at which to store data that satisfies the particular pattern;
requesting and receiving the data from a memory that is not a cache of the device;
storing the data in the target cache level without storing the data in all of the cache levels of the cache; and
storing, in a particular level of the cache that a different cache level than the target cache level in the cache level hierarchy, the data in a particular cache line of the particular level that is a least recently used cache line identified by a least recently used bit for the particular level in the cache level hierarchy and not updating the least recently used bit so that the least recently used bit does not indicate that the particular cache line has been updated to include the data; and
providing the data to the component.

* * * * *